United States Patent [19]

Delseth et al.

[11] Patent Number: 4,532,080
[45] Date of Patent: Jul. 30, 1985

[54] ADHESION PROMOTERS

[75] Inventors: Jean-Marc Delseth, Gembloux; Daniel E. Mauer, Louvain; Philippe G. Moniotte, Heron, all of Belgium

[73] Assignee: Monsanto Europe, S.A., Brussels, Belgium

[21] Appl. No.: 540,955

[22] Filed: Oct. 11, 1983

[30] Foreign Application Priority Data

Oct. 21, 1982 [GB] United Kingdom ................. 8230136

[51] Int. Cl.³ ..................... C07F 15/04; C07F 15/06
[52] U.S. Cl. ................................... 556/139; 260/400; 260/402; 428/465; 556/119; 556/120; 556/45; 556/177
[58] Field of Search ............... 260/439 R, 429 K, 400, 260/402

[56] References Cited

U.S. PATENT DOCUMENTS

| | | | |
|---|---|---|---|
| 2,555,370 | 6/1951 | Prutton | 260/439 R |
| 2,777,874 | 1/1957 | Asseff et al. | 260/439 R X |
| 2,862,847 | 12/1958 | Craig et al. | 260/439 R X |
| 2,912,355 | 11/1959 | Formanek et al. | 154/130 |
| 2,921,083 | 1/1960 | Gaertner | 260/400 |
| 3,133,946 | 5/1964 | Maurer et al. | 260/439 R |
| 3,133,949 | 5/1964 | Rutkowski et al. | 260/439 R X |
| 3,383,396 | 5/1968 | Cahn et al. | 260/402 X |
| 3,535,249 | 10/1970 | Larson | 260/23 |
| 3,732,192 | 5/1973 | Arnold | 260/79.5 B |
| 3,888,918 | 6/1975 | Kuehnhauss | 260/429 K X |
| 3,991,130 | 11/1976 | Cowell et al. | 260/775 |
| 4,137,359 | 1/1979 | Bak et al. | 428/295 |
| 4,340,515 | 7/1982 | Frassek et al. | 524/274 |
| 4,417,012 | 11/1983 | Moniotte | 524/83 |

OTHER PUBLICATIONS

Chemical Abstracts, 92: 173690c, (1980).
Chemical Abstracts, 95: 17241p, (1981).

*Primary Examiner*—Helen M. S. Sneed
*Attorney, Agent, or Firm*—Gordon B. Seward

[57] ABSTRACT

The bond strength between a sulphur-vulcanizable rubber and a metal, especially brass, is increased by using as bonding promoter an organic substance containing one or more groups of the formula —S—SO$_2$R where R represents (a) a radical —OM where M is a monovalent metal, the equivalent of a multivalent metal, a monovalent ion derived by the addition of a proton to a nitrogenous base or the equivalent of a multivalent ion derived by the addition of two or more protons to a nitrogenous base, or (b) an organic radical. Preferred promoters include sodium, zinc, nickel and cobalt organothiosulphates.

5 Claims, No Drawings

ADHESION PROMOTERS

BACKGROUND OF THE INVENTION

This invention relates to the bonding of rubber to metal.

Articles in which rubber is bonded to metal have been known for many years, and since the introduction of the steel-belted radial tyre, rubber/metal bonding has been very extensively studied. It it known that certain substances will act as adhesion promoters to improve the initial adhesion level between the rubber and the metal and the maintenance of the adhesion level during accelerated laboratory ageing tests designed to simulate conditions to which the article may be subjected during its service life.

The main adhesion promoters currently used to promote the bonding of brass-coated steel to rubber are cobalt compounds, for example cobalt naphthenate, and resorcinol-and/or melamine-formaldehyde resins used in conjunction with hydrated silica. Both of these types of adhesion promoters, which can be employed separately or in combination, have disadvantages, and alternative rubber/metal adhesion promoters to those currently employed are therefore desirable. Such alternatives are provided by the present invention.

BRIEF SUMMARY OF THE INVENTION

An aspect of the present invention is a composite comprising a sulphur-vulcanisable rubber composition containing a rubber/metal adhesion promoter, and a component having a metal surface in contact with the said composition, in which the adhesion promoter is an organic substance containing one or more groups of the formula $-S-SO_2R$ where R represents (a) a radical $-OM$ where M is a monovalent metal, the equivalent of a multivalent metal, a monovalent ion derived by the addition of a proton to a nitrogenous base or the equivalent of a multivalent ion derived by the addition of two or more protons to a nitrogenous base, or (b) an organic radical selected from aliphatic, cycloaliphatic, aromatic and heterocyclic radicals, and radicals which are combinations of any two or more such radicals.

The adhesion promoter can, for example, be a compound having the formula $R^1(S-SO_2R)_n$ where $R^1$ represents an organic radical and n has a value of from 1 to 4, or a polymer in which $-S-SO_2R$ groups occur as, or as the terminal portions of, groups pendant from the polymer chain.

The invention also includes a method of making an article in which vulcanised rubber is bonded to a metal, which comprises heating a composite of the invention to vulcanisation temperture to vulcanise the rubber and to bond the rubber to the metal.

DETAILED DESCRIPTION OF THE INVENTION

The adhesion promoters are, in many instances, compounds in which thiosulphate groups $-S-SO_2OM$ or thiosulphonate groups $-S-SO_2R$ are each linked to a primary carbon atom of the organic radical $R^1$, or polymers in which the thiosulphate or thiosulphonate groups are linked to primary carbon atoms in side chains attached to the main polymer chain. The thiosulphate or thiosulphonate groups therefore usually occur in the form $-CH_2-S-SO_2R$. This is because the starting materials required for the production of such promoters are generally the most readily available. Functionally, however, compounds in which a thiosulphate group is attached to a secondary carbon atom of the radical $R^1$ are satisfactory.

When the adhesion promoter is a compound having the formula $R^1-(S-SO_2R)_n$ in which n has the value of 1, the organic radical $R^1$ can be, for example, a monovalent aliphatic, cycloaliphatic, aromatic or heterocyclic radical, or a radical which is a combination of any two or more such radicals.

Monovalent aliphatic radicals from which $R^1$ in the above formula may be selected include straight- and branched-chain alkyl and alkenyl groups, more especially such groups containing from 1 to 20 carbon atoms, for example, methyl, ethyl, n-propyl, isopropyl, allyl, sec-butyl, isoamyl, n-hexyl, hex-3-enyl, n-heptyl, n-octyl, 2-ethylhexyl, and decyl, dodecyl, pentadecyl, hexadecyl and octadecyl groups.

When $R^1$ is monovalent cycloaliphatic, it is usually a radical containing from 5 to 8 ring carbon atoms, which may be saturated or contain one or two olefinic bonds, for example a cyclopentyl, cyclohexyl or cyclohexenyl group.

Monovalent aromatic radical $R^1$ may be, for example, phenyl, naphthyl or biphenyl, and a heterocyclic radical may be, for example, pyridyl, imidazol-2-yl or thiazole-2-yl.

Monovalent radicals which are combinations of two or more of the foregoing radicals include alkylcycloalkyl radicals, for example methylcyclohexyl; alkaryl radicals, for example phenyl($C_{1-16}$ alkyl) radicals, preferably phenyl($C_{1-6}$ alkyl) radicals, such as benzyl and phenethyl; and fused-ring aromatic-heterocyclic radicals, for example quinolyl, benzimidazol-2-yl and benzothiazol-2-yl.

Also included are monovalent radicals having substitutent atoms or groups, for example halogen such as chlorine or bromine, or nitro, hydroxyl, alkoxy, carboxy, alkoxycarbonyl, alkylcarbonyl, or (phosphonomethyl)amino alkyl groups. Examples include haloalkyl, for example $C_{2-20}$ chloroalkyl such as 2-chloroethyl; $C_{2-20}$ alkoxyalkyl, for instance butoxyethyl; $C_{3-20}$ alkylcarbonyloxyalkyl, for instance 2-(propionyloxy)ethyl, $C_{3-20}$ alkoxycarbonylalkyl, for instance 2-(methoxycarbonyl)ethyl, 2-(ethoxycarbonyl)ethyl, 1-(methoxycarbonyl)ethyl and 1-(ethoxycarbonyl)ethyl, bis(phosphonomethyl)amino $C_{2-6}$ alkyl, chlorotolyl, hydroxyphenyl, and carboxypyridyl.

Compounds within the above formula where n has the value 1 include a sub-class where $R^1$ represents a $C_{3-20}$ alkyl group, a $C_{2-20}$, preferably $C_{3-12}$, chloroalkyl group, a $C_{3-20}$, preferably $C_{3-12}$, alkenyl group, a benzyl group, a phenethyl group, a $C_{2-20}$ alkoxyalkyl group, a $C_{3-20}$ alkylcarbonyloxyalkyl group, or a 2,5-dihydroxyphenyl group. In a further sub-class, $R^1$ represents a grouping $R^7OOCR^8-$ where $R^7$ is a $C_{1-12}$ alkyl group, preferably a $C_{1-8}$ alkyl group and $R^8$ is a $C_{1-12}$ alkylene group.

In adhesion promoters which are compounds of the above formula in which n has a value of 2, 3 or 4, groups of the formula $-S-SO_2R$ are linked by an organic bridging group. In compounds having two groups $-S-SO_2R$, the bridging group is divalent, and such compounds can be represented by the formula $RO_2S-S-X'-S-SO_2R$.

In this formula X' can be, for example, a straight- or branched-chain alkylene group, preferably one containing 2 or from 5 to 40 carbon atoms, and more preferably one containing 5 to 16 carbon atoms, or an analogous group containing one or more double or triple bonds, for example an alkenylene or alkadienylene group. Examples of such groups are ethylene, pentamethylene, hexamethylene, octamethylene, nonamethylene, decamethylene, dodecamethylene, 3-methyl-1,5-pentylene, 1,4-but-2-enylene, 1,6-hex-2-enylene and 1,8-octa-2,6-dienylene. As a variant, a divalent bridging group may be an alkylene or alkenylene group having one or more aryl, for example phenyl, substituents. An example of such a radical is 2-phenyl-1,4-butylene.

In other instances, X' has a structure comprising two or more alkylene units, pairs of such units being linked through an oxygen or sulphur atom, through a group $-SO_2-$, $-NH-$, $-NH_2^+-$, $-N(C_{1-6}$ alkyl$)-$, $-NH^+(C_{1-6}$alkyl$)-$, $-CO-$, $-COO-$, or $-CONR^6-$ where $R^6$ is hydrogen or $C_{1-6}$ alkyl, or through an arylene or cycloalkylene radical. Representative of such structures are those of the formulae $$-(CH_2)_a-O-(CH_2)_a-$$

$$-(CH_2)_a-O-(CH_2)_{a'}-O-(CH_2)_a-$$

$$-(CH_2)_b-CO-(CH_2)_b-$$

$$-(CH_2)_c-COO-(CH_2)_a-$$

and $$-(CH_2)_c-COO-Y-OOC-(CH_2)_c-,$$

where each a, a' and c independently represents an integer of from 1 to 20, each b independently represents an integer of from 1 to 10, and Y represents a group $-(CH_2)_c-$ or a group $-(CH_2CH_2O)_dCH_2CH_2-$ where d represents an integer of from 1 to 5. Preferred values for a are from 1 to 8, for example from 3 to 8, preferred values for a' are from 1 to 6, preferred values for b are 1 to 4, and preferred values for c are from 1 to 18, more especially 1 to 12, for example from 3 to 12.

Other examples of the group X' are those having the formula $-(CH_2)_e-SO_2-(CH_2)_e-$, $-NH(CH_2)_e-$ and $-(CH_2)_e-NH_2^+-(CH_2)_e-$ where each e independently has a value from 2 to 20, preferably from 2 to 18, and more preferably from 2 to 12.

Where values of a, a', b, c or e exceed 2, the polymethylene groups can be straight chain or branched.

Adhesion promoters having two, three or four thiosulphate or thiosulphonate groups include those where two, three or four groups $-C_mH_{2m}-S-SO_2R$, m typically having a value from 1 to 6, are substituents in an aromatic nucleus, for example a benzene or naphthalene nucleus, (which may also contain other substituents), or as substituents in one or more nuclei of a di- or tri-nuclear aromatic compound, for example biphenyl, diphenyl ether, diphenyl sulphone or benzophenone. Other examples are tri-N-substituted s-hexahydro triazines where the substituent on each nitrogen atom is a group having the formula $-COC_mH_{2m}-S-SO_2R$. The most readily available of thexe hexahydrotriazines are compounds where R is OM, for instance ONa, and m has the value 2.

Further examples of trivalent bridging groups are those of the formulae $$-A^1-OCH_2CH(OA^1-)CH_2OA^1- \text{ and } A-C(AOOCA^1-)_3$$

where each $A^1$ is independently an alkylene group, for example a $C_{2-18}$, preferably a $C_{2-12}$, alkylene group and A is $C_{1-6}$ alkyl; and also those of the formulae $N[(CH_2)_e]_3$ and $HN^+[(CH_2)_e]_3$ where each e independently has a value of from 2 to 20, preferably from 2 to 18, more especially from 2 to 12.

Further examples of tetravalent bridging groups are those having the formulae $$C(A^1)_4, Si(A^1)_4 \text{ and } (A^1)_3Si-O-Si(A^1)_3$$

where $A^1$ has the same meaning as before; and those having the formula $$C[CH_2OCO(CH_2)_e]_4$$

where each e independently has a value of from 1 to 20, preferably from 2 to 18 and more preferably from 2 to 12.

Examples of polymers are those of the formulae $$(-O-CH_2CH-)_{n'} \overset{|}{\underset{}{CH_2-S-SO_2R}}$$

and esterified and partially esterified polyvinyl alcohols wherein the polymer chain is formed from units selected from

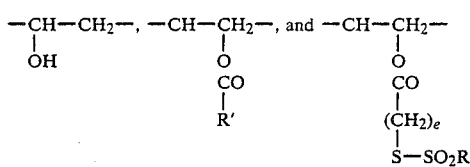

where R' represents a $C_{1-12}$ alkyl group and e has an integral value of from 1 to 20, and at least 10%, preferably at least 20% for example from 25% to 75%, of the units in the polymer are those containing the group $-S-SO_2R$.

The optimum number of carbon atoms in the alkylene units to which the thiosulphate or thiolsulphonate groups are attached to bridging groups of the kind described above where two or more alkylene units are linked through atoms or groups, or where the thiosulphate or thiolsulphonate groups are attached to units pendant from polymer chains, the optimum value of m in the formula $-C_mH_{2m}-S-SO_2R$, and the optimum number of carbon atoms in the groups $A^1$, depend on the remainder of the structure of the bridging group.

A further requirement is that the relative locations of the thiosulphte or thiolsulphonate groups should not be such that significant intramolecular cyclisation can occur when a rubber composition containing the adhesion promoter is heated.

Thus, within the class of compounds defined above there will be found differing degrees of adhesion promoter activity, but methods of evaluation as subsequently described are conventional, and it is therefore a matter of simple and minimum experimentation for the person skilled in the art to determine whether a particular compound will usefully promote the rubber/metal adhesion.

When M in the above formula of the adhesion promoter represents a monovalent metal, this can be for instance an alkali metal, for example sodium, lithium or potassium. For economic reasons, sodium is the preferred alkali metal. M can alternatively represent the equivalent of a multivalent metal, for instance magnesium, calcium, barium, zinc, nickel, cobalt, manganese or aluminum.

Where M represents a monovalent ion formed by the addition of a proton to a nitrogenous base, the nitrogenous base can be ammonia or a simple primary, secondary or tertiary amine $$R^2NH_2, R^2R^3NH \text{ or } R^2R^3R^4N$$

where each of $R^2$, $R^3$ and $R^4$ independently represents an alkyl group, for example a $C_{1-20}$ alkyl group, a $C_{5-9}$ cycloalkyl or alkylcyclohexyl group, a benzyl group, a phenyl group or a substituted phenyl group, provided that no more than one of $R^2$, $R^3$ and $R^4$ is a phenyl or substituted phenyl group. Examples of such amines are the secondary amines $R^2R^3NH$ where one of $R^2$ and $R^3$ is a tert-alkyl group, for instance a tert-alkyl group having from 4 to 12 carbon atoms, such as tert-butyl, tert-amyl or 1,1,3,3-tetramethylbutyl, and the other is a benzyl group or a cyclohexyl or alkylcyclohexyl group. Alternatively both $R^2$ and $R^3$ can be tert-alkyl groups. Further examples are tertiary amines where $R^2$ is a tert alkyl group and $R^3$ and $R^4$ are benzyl groups.

Other suitable amines are the primary amines $R^2NH_2$ where $R^2$ is a phenyl or substituted phenyl group, and the secondary amines $R^2R^3NH$ where $R^2$ is a phenyl or substituted phenyl group and $R^3$ is a $C_{1-20}$ alkyl group, preferably a $C_{1-12}$ alkyl group. Examples of such amines are aniline, the toluidines, N-methylaniline, N-butylaniline and N-isohexylaniline. A special class of such secondary amines comprises those where $R^2$ represents a secondary alkyl group, preferably a $C_{3-12}$ secondary alkyl group, or a cyclohexyl group, and $R^3$ represents a 4-phenylaminophenyl group. These amines include compounds such as
N-isopropyl-N'-phenyl-p-phenylenediamine,
N-sec-butyl-N-'-phenyl-p-phenylenediamine,
N-1,3-dimethylbutyl-N'-phenyl-p-phenylenediamine,
N-1,4-dimethylpentyl-N'-phenyl-p-phenylenediamine and
N-cyclohexyl-N'-phenyl-p-phenylenediamine.
Such amines function as mono-acid bases despite the presence of the second nitrogen atom in the 4-phenylaminophenyl group, because this second nitrogen atom has virtually no basicity.

Other examples of nitrogenous bases which form thiosulphate salts useful in the invention are substituted isothioureas, for example those of the formula

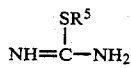

where $R^5$ represents a $C_{1-20}$ alkyl group, a $C_{5-9}$ cycloalkyl or alkylcycloalkyl group or a benzyl group. Specific examples of substituted isothioureas are S-ethylisothiourea and S-benzylisothiourea.

Where M represents an equivalent of a multivalent cation formed by the addition of two or more protons to a nitrogenous base, the bases from which such ions can be derived include alkylene diamines, N,N'-disubstituted alkylene diamines, phenylenediamines and N,N'-disubstituted phenylenediamines of the formula $R^2NH-A-NHR^2$ where A represents an alkylene radical $-(CH_2)_c-$ where c has a value of from 2 to 20, preferably from 2 to 12, and which may be straight chain or branched, or a phenylene, for example a meta- or paraphenylene radical, and each $R^2$ independently represents an alkyl group, for example a $C_{1-20}$ alkyl group, a $C_{5-9}$ cycloalkyl or alkylcycloalkyl group, a benzyl group, a phenyl group or substituted phenyl group, provided that neither $R^2$ is a phenyl or substituted phenyl group when A is a phenylene radical.

In preferred amines where A represents an alkylene radical, $R^2$ is a tert-alkyl group, for example tert-butyl, t-amyl or 1,1,3,3-tetramethylbutyl, or a phenyl group. Examples of such amines are N,N'-diphenylethylene N,N'-di-tert-butyl-1,4-tetramethylene diamine and N,N'-bis(1,1,3,3-tetramethylbutyl)-1,6-hexamethylene diamine.

In preferred amines where A represents a phenylene radical, $R^2$ is a secondary alkyl group, preferably a $C_{3-12}$ secondary alkyl group or a cyclohexyl group. Examples of such amines are N,N'-di-sec-butyl-p-phenylenediamine, N,N'-bis(1,3-dimethylbutyl)-p-phenylenediamine, N,N'-bis(1,4-dimethylpentyl)-p-phenylendiamine, N,N'-bis(1-ethyl-3-methylpentyl)-p-phenylenediamine, N,N'-bis(1-methylheptyl)-p-phenylendiamine and N,N'-dicyclohexyl-p-phenylendiamine.

Possible bases also include polyalkylene polyamines of the formula $$R^2NH-(A'-NH)_n-A'NHR^2$$

where A' represents an alkylene radical of from 2 to 8 carbon atoms, n has a value of from 1 to 5, and each $R^2$ independently represents a $C_{1-20}$ alkyl group, a $C_{5-9}$ cycloalkyl or alkylcycloalkyl group, a benzyl group, a phenyl group or a substituted phenyl group.

In other instances, the nitrogen of the nitrogenous base is part of a heterocyclic ring. The base can be monocyclic, for example pyridine, or a compound in which the nitrogen-containing heterocyclic ring is fused to another ring, as for example quinoline. Moreover, the heterocyclic ring can be saturated, as for example in morpholine or piperidine, or it may contain one or more double bonds, as for example in pyrrolidine or 1,2-dihydroquinoline.

Of the compounds where M represents such a base, those preferred for use as adhesion promoters are compounds where M represents a 1,2-dihydroquinolinium ion, which may optionally have ring substituents. Examples of such ions are 2,2,4-trimethyl-1,2-dihydroquinolinium, 2,2,4-trimethyl-6-($C_{1-12}$alkoxy)-1,2-dihydroquinolinium, for instance 2,2,4-trimethyl-6-ethoxy-1,2-dihydroquinolinium, 2,2,4-trimethyl-6-($C_{1-18}$alkyl)-1,2-dihydroquinolinium, for instance 2,2,4-trimethyl-6-dodecyl-1,2-dihydroquinolinium, and 2,4-diethyl-2-methyl-1,2-dihydroquinolinium.

Other classes of bases which form divalent cations by the addition of two protons are represented by the general formulae

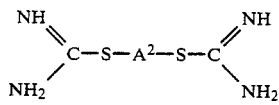

and

-continued

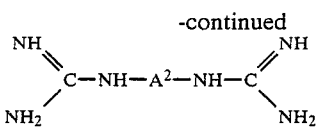

where $A^2$ represents a radical $-(CH_2)_e-$, where e is an integer from 2 to 20, preferably from 2 to 12, and the radical $-(CH_2)_e-$ can be either straight chain or branched or a $C_{2-20}$ alkylene or alkadienylene radical, for example a but-2-enylene or octa-2,6-dienylene radical. These bases form bis(isothiouronium) and bis(guanidinium) ions respectively.

When R in the groups $S-SO_2R$ of the adhesion promoter is an organic radical, aliphatic radicals from which R may be selected include straight- and branched-chain alkyl and alkenyl groups, more especially such groups containing from 1 to 20 carbon atoms, for example, methyl, ethyl, n-propyl, isopropyl, sec-butyl, tert-butyl, isoamyl, t-amyl, n-hexyl, hex-3-enyl, n-heptyl, n-octyl, 2-ethylhexyl, and decyl, dodecyl, pentadecyl and octadecyl groups.

When R is cycloaliphatic, it is usually a radical containing from 5 to 8 ring carbon atoms, which may be saturated or contain one or two olefinic bonds, for example a cyclopentyl, cyclohexyl or cyclohexenyl group.

An aromatic radical R may be, for example, phenyl, naphthyl or biphenyl, and a heterocyclic radical may be, for example, pyridyl, imidazol-2-yl or thiazol-2-yl.

Radicals which are combinations of two or more of the foregoing radicals include alkylcycloalkyl radicals, for example methylcyclohexyl; alkyaryl radicals, for example tolyl, dimethylphenyl and ethylphenyl; arylalkyl radicals, for example benzyl and phenethyl; and fused-ring aromatic-heterocyclic radicals, for example quinolyl, benzimidazol-2-yl and benzothiazol-2-yl.

Also included are radicals having substituent atoms or groups, for example halogen such as chlorine or bromine, or nitro, hydroxyl, carboxy, carboalkoxyl or alkylcarbonyl groups. Examples include chloroethyl, chlorotolyl, hydroxyphenyl, carboxypyridyl and nitrobenzothiazolyl.

Specific compounds or classes of compounds useful as adhesion promoters include the salts and hydrated salts of n-butylthiosulphate, n-pentylthiosulphate, isopentylthiosulphate, n-hexylthiosulphate, isohexylthiosulphate, n-heptylthiosulphate, isooctylthiosulphate, 2-ethylhexylthiosulphate, and the straight- and branched-chain dodecylthiosulphates, hexadecyl thiosulphates and octadecylthiosulphates, of prop-2-enylthiosulphate, but-2-enylthioslphate, pent-3-enylthiosulphate, hex-3-enylthiosulphate, oct-3-enylthiosulphate and dodec-4-enylthiosulphate, of 3-chloropropylthiosulphate, 4-chlorobutylthiosulphate, 6-chlorohexylthiosulphate and 10-chlorodecylthiosulphate, of benzylthiosulphate, 1, phenylethylthiosulphate, 2-phenylethylthiosulphate, 4-phenylbutylthiosulphate, 3-phenylpentylthiosulphate and the various isomeric phenyloctyl-, phenylnonyl- and phenyldodecylthiosulphates, of 2,5-dihydroxyphenylthiosulphate, of ethylene bisthiosulphate, pentamethylene-1,4-bisthiosulphate, hexamethylene-1,5-bis thiosulphate, heptamethylene-1,7-bis thiosulphate, octamethylene-1,8-bis thiosulphate, nonamethylene-1,9-bis thiosulphate, decamethylene-1,10-bis thiosulphate, dodecamethylene-1,12-bis thiosulphate and hexadecamethylene-1,16-bis thiosulphate, of but-2-ene-1,4-bis thiosulphate, pent-2-ene-1,5-bis thiosulphate, hex-3-ene-1,6-bis thiosulphate, oct-4-ene-1,8-bis thiosulphate, octa-2,6-diene-1,8-bis thiosulphate and octa-3,5-diene-1,8-bis thiosulphate with the cations sodium, magnesium, calcium, barium, zinc, cobalt and nickel; with the cations ammonium, $N(C_{4-12}tert\text{-alkyl})$-N-benzylammonium, for example N-tert-butyl-N-benzylammonium and N-(1,1,3,3-tetramethylbutyl)-N-benzylammonium, N-isopropyl-N-(4-phenylaminophenyl)ammonium, N-(1,3-dimethylbutyl)-N-(4-phenylaminophenyl)ammonium, N-cyclohexyl-N-(4-phenylaminophenyl)ammonium, 2,2,4-trimethyl-1,2-dihydroquinolinium, guanidinium and benzylisothiouronium; with divalent cations of the formula

where A represents paraphenylene and $R^2$ is a $C_{3-12}$ secondary alkyl group, for example a 1,4-dimethylpentyl group; and with divalent cations of the formula

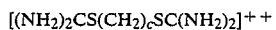

where c has any one of the integral values from 2 to 12 so that $(CH_2)_c$ represents for example tetramethylene, pentamethylene, hexamethylene, octamethylene or decamethylene.

Other classes of compounds useful as adhesion promoters in the present invention are those having the following formulae and their hydrates:

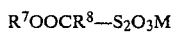

where $R^7$ is methyl, ethyl, n-propyl, isopropyl, n-butyl, sec-butyl, n-hexyl, or 2-ethylhexyl, and $R^8$ is ethylene, ethylidene, propylene, butylene, 2-methylpropylene, hexamethylene or decamethylene,

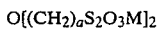

where a has any one of the values 2, 3, 4, 5 and 6, and the compound

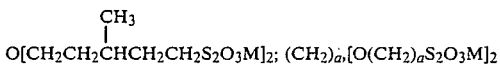

where a' has any one of the values 1, 2, 3 or 4 and a has any one of the values 2, 3, 4, 5 and 6.

where c has any one of the integral values from 1 to 10 in combination with any one of the integral values 2, 3, 4, 5 and 6 for a;

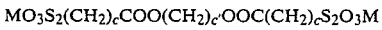

where each c' has any one of the integral values from 2 to 10 in combination with any one of the integral values from 1 to 12 for c;

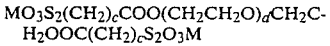

where each c has any one of the integral values from 1 to 10 in combination with any one of the values 1, 2 and 3 for d; the compounds

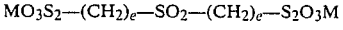

where each e has an integral values from 2 to 8; the compounds $$MO_3S_2-(CH_2)_b-CO-(CH_2)_b-S_2O_3M$$

where each b has an integral value from 1 to 4; the compounds $$MO_3S_2-C_mH_{2m}-C_6H_4-C_mH_{2m}-S_2O_3M \text{ and}$$

$$MO_3S_2-C_mH_{2m}-C_{10}H_6-C_mH_{2m}-S_2O_3M$$

where each m has the value 1, 2 or 3 and $C_6H_4$ represents phenylene, for example meta- or para-phenylene, and $C_{10}H_6$ represents naphthylene, for example 1,4-naphthylene or 1,5-naphthylene; where in each instance M represents sodium or an equivalent of magnesium, calcium, barium, zinc, nickel or cobalt, or is selected from the cations $N(C_{4-12}tert-alkyl)-N-benzylammonium$, for example N-tert-butyl-N-benzylammonium and N-1,1,3,3-tetramethylbutyl)-N-benzylammonium, N-isopropyl-N-(4-phenylaminophenyl)ammonium, N-(1,3-dimethylbutyl)-N-(4-phenylaminophenyl)ammonium, N-cyclohexyl-N-(4-phenylaminophenyl)ammonium, 2,2,4-trimethyl-1,2-dihydroquinolinum, 6-ethoxy-2,2,4-trimethyl-1,2-dihydroquinolium, and benzylisothiouronium.

Many of the adhesion promoters referred to herein are described in EP-A-0070413, where they are shown to be useful vulcanisate stabilizers. Compounds not referred to therein but which are useful according to the present invention as rubber-metal bonding promoters and are new compounds, include those of the formula $R^1-S-SO_3M$ and their hydrates where $R^1$ is an organic radical and M represents an equivalent of magnesium, calcium, barium, zinc, cobalt or nickel. Specifically to be mentioned are those where $R^1$ is a $C_{3-20}$ alkyl or $C_{2-20}$ chloroalkyl group, a $C_{3-20}$ alkenyl group, a phenyl$(C_{1-16})$alkyl group or a 2,5-dihydroxyphenyl group or a grouping of the formula $R^7OOCR^8-$ where $R^7$ is a $C_{1-12}$ alkyl group and $R^8$ is a $C_{1-12}$ alkylene group.

Also novel are compounds and their hydrates where M represents an alkali metal, for example sodium, and $R^1$ represents a $C_{2-20}$ chloroalkyl group, a $C_{3-20}$ alkenyl group or a grouping of the formula $R^7OOCR^8-$ where $R^7$ is a $C_{1-12}$ alkyl group and $R^8$ is a $C_{1-12}$ alkylene group.

These compounds can be prepared by the reaction of an organic chloride of the formula $R^1Cl$ with sodium or potassium thiosulphate using, for example, procedures as described in EP-A-0070143, followed by the conversion, where appropriate, of the initially-formed alkali metal salt to the corresponding magnesium, calcium, barium, zinc, cobalt or nickel salt. Methods for such conversion are described in EP-A-0070143. An alternative procedure comprises mixing the alkali metal salt and a nickel salt in a solvent in which both are at least moderately soluble but in which the by-product sodium chloride has low stability. Absolute methanol can be used as such a solvent.

The adhesion promoters referred to above are especially effective in compositions in which the rubber is cis-polyisoprene, either natural or synthetic, and in blends containing at least 25% by weight of cis-polyisoprene with other rubbers. Preferably the rubber, if a blend, contains at least 40% and more preferably at least 60% by weight of cis-polyisoprene. Examples of other rubbers which may be blended with cis-polyisoprene include poly-1,3-butadiene, copolymers of 1,3-butadiene with other monomers, for example styrene, acrylonitrile, isobutylene and methyl methacrylate, ethylene-propylene-diene terpolymers, and halogen-containing rubbers such as chlorobutyl, bromobutyl and chloroprene rubbers.

In the compositions of the invention the essential vulcanising agent is sulphur, but other vulcanising agents such as amine disulphides need not be excluded. The amount of sulphur in the compositions is typically from 2 to 6 parts, for example from 3 to 6, by weight per 100 parts by weight of rubber, but lesser or larger amounts, for example from 1 to 7 or 8 parts on the same basis, may be employed. A preferred range is from 2.5 to 4 parts per 100 parts by weight of rubber. An advantage of the adhesion promoters of the invention over the conventionally-used cobalt compounds is that they are effective at lower sulphur levels. The principal significance of this is that over the range of sulphur levels that gives vulcanisates of acceptable physical properties, those vulcanisates prepared using lower levels of sulphur show greater resistance to reversion and oxidative ageing than those prepared using higher levels of sulphur.

Examples of vulcanisation accelerators which can be used in the present invention are the thiazole-based accelerators, for example 2-mercaptobenzothiazole, bis(2-benzothiazolyl)disulphide, 2(2',4'-dinitrophenylthio)benzothiazole, benzothiazole-2-sulphenamides for instance N-isopropyl-benzothiazole-2-sulphenamide, N-tert-butyl-benzothiazole-2-sulphenamide, N-cyclohexylbenzothiazole-2-sulphenamide, and 2(morpholinothio)benzothiazole, and thiocarbamylsulphenamides, for example N,N-dimethyl-N',N'-dicyclohexyl-thiocarbamoyl-sulphenamide and N(morpholinothiocarbonylthio)morpholine. A single accelerator or a mixture of accelerators may be used. Best results are usually obtained using the benzothiazole-2-sulphenamides, especially those with relatively long induction times, for example N,N-dicyclohexyl-benzothiazole-2-sulphenamide and 2(morpholinothio)benzothiazole. In the compositions of the invention, these are usually used in amounts of from 0.3 to 2, for example from 0.3 to 1.5, preferably from 0.4 to 1.0 and more preferably from 0.5 to 0.8, parts by weight per 100 parts by weight of rubber.

The adhesion promoters defined above are very effective in promoting bonding between rubber and brass, for example the bonding between rubber and brass-coated steel. The brass typically has a copper content of from 60 to 70% by weight, more especially from 63 to 68% by weight, with the optimum percentage depending on the particular conditions under which the bond is formed. The brass coating on brass-coated steel can have a thickness of, for example, from 0.05 to 1 micrometer, preferably from 0.07 to 0.7 micrometer, for example from 0.15 to 0.4 micrometer.

Rubber can also be bonded effectively to alloys of copper and zinc containing small amounts of one or more other metals, for example cobalt, nickel or iron.

For bonding rubber to zinc, as for example in bonding rubber to zinc-coated steel cords (which are widely used in the manufacture of conveyor belting) cobalt compounds have been used as adhesion promoters. Examples of such compounds are cobalt naphthenate and the cobalt-boron complexes described in GB-A-2 022 089. The thiosulphate and thiosulphonate adhesion promoters described above, other than the cobalt thiosulphates, generally show only weak promoter activity for the bonding of rubber to zinc when used alone. However, mixed adhesion promoters in which, for example, the alkali metal or nickel thiosulphates described above, partially replace the conventional cobalt compound, show improved promoter effect over the conventional cobalt compound alone.

An aspect of the present invention is thus a rubber-metal composite in which the metal surface is zinc, the rubber composition contains a compound of the formula $R^1-(S-SO_3M)_n$ as defined above and the composite also contains a cobalt compound, which may be a compound of the above formula in which M represents an equivalent of cobalt, or another cobalt compound.

The amount of adhesion promoter employed in the present invention is usually from 0.1 to 6 parts by weight, and preferably from 0.5 to 4, for example from 2 to 4, parts by weight per 100 parts by weight of rubber.

The adhesion promoters used in this invention can be incorporated into rubber by conventional mixing procedures, for example by adding them in a Banbury mixer or by adding them to the rubber on a mill. Ordinarily, with liquid or low melting solid additives, no special precautions are necessary for obtaining good dispersions. However, when using higher melting solids it is recommended that they be ground to a fine powder, preferably 70 micrometer particle size or less, to ensure adequate dispersion. In certain instances, it is convenient to add a solid adhesion promoter as a predispersion of particulate material in a rubber-compatible hydrocarbon oil or polymer, for example EPDM rubber.

Additives which are conventionally present in rubber compositions which are to be bonded to metal are normally used in the vulcanisable compositions of the present invention. Such additives include carbon black, usually a carbon black of the N300 series such as N347 or N326, which typically is used in an amount of from 40 to 70 parts by weight per 100 parts by weight of rubber. Other such additives are, for example, zinc oxide, which may be used in an amount of, for instance, from 2 to 10 parts by weight per 100 parts by weight of rubber; stearic acid at a level of, for instance, from 0.5 to 2, for example from 1 to 2, parts by weight per 100 parts by weight of rubber; hydrocarbon softeners and extender oils; antidegradants, for example N-alkyl-N'-phenyl-p-phenylendiamines; and tackifiers. Other fillers may be used, for example silica, and the rubber stocks may also contain metal oxide activators other than zinc oxide, for example magnesium oxide, phenolic, resorcinol and/or melamine adhesive resins, and prevulcanization inhibitors, for instance N-cyclohexylthiophthalimide. The metal surface to which the rubber is to be bonded can be subjected to various pre-treatments, for example to ensure complete cleanliness or to confer corrosion resistance.

Evaluation of the adhesion promoters was carried out using a vulcanisable rubber composition of a type known as "skimstock" as follows:

|  | Parts by Weight |
| --- | --- |
| Natural Rubber | 100 |
| HAF Carbon Black | 55 |
| Zinc Oxide | 8 |
| Stearic Acid | 2 |
| Process Oil | 3 |
| Tackifier | 3 |

-continued

|  | Parts by Weight |
| --- | --- |
| Antiozonant[1] | 2 |
| Antioxidant[2] | 1 |
| Sulphur | 4 |
| Accelerator[3] | 0.7 |
| Bonding Promoter | 3[4] |

[1]N—1,3-dimethylbutyl-N'—phenyl-p-phenylenediamine
[2]Polymerised 2,2,4-trimethyl-1,2-dihydroquinoline
[3]2(morpholinothio)benzothiazole except where indicated in Table 1 by $^{cx}$, when the accelerator was N,N—dicyclohexylbenzothiazole-2-sulphenamide
[4]In comparative experiments using cobalt naphthenate as bonding promoter, 1.5 parts by weight of cobalt naphthenate containing 10% by weight of cobalt were used.

Mixing of the components except sulphur and accelerator was done in a laboratory scale Banbury mixer having a capacity of 1.57 liter and operating at a filling factor of about 0.8 and a rotor speed of 117 r.p.m., according to the following schedule:

| Time (mins.) |  |
| --- | --- |
| 0 | Rubber placed in a mixer and rotors started. |
| 1 | Half carbon black and zinc oxide added. |
| 2.5 | Remainder of carbon black, stearic acid, process oil, tackifier, antiozonant, antioxidant, bonding promoter added. |
| 4 | Sweep. |
| 5 | Dumped at temperature 150 ± 5° C. |

The batch was then transferred to a mill at 75°-70° C. for sheeting off. Sulphur and accelerator were added to portions of the masterbatch on a mill as required.

The metal component was a typical brass-coated steel tyre cord having the construction 3+9+15×0.175+1. In most cases the cord had a 0.20 micrometer-thick coating of brass having a copper content of 63.5±3% by weight. Results marked with an asterisk were obtained using cord with a 0.18 micrometer-thick coating of brass having a copper content of 67.5±3%.

Rubber/metal bond strengths were measured using the adhesion test described by R. C. Ayerst and E. R. Rodger, Rubber Chem. Technol. 45, 1497(1972). In this method, adhesion blocks are prepared in a similar manner to that specified in ASTM D-2229, but using clamping plates to hold the cords in the mould to maintain alignment during cure, and a frame for pre-loading and uniformly stressing the cord before mould building. The adhesion block comprises a strip of rubber having one end of each of several uniformly-spaced lengths of cord embedded in one edge of the strip, and a similar array of lengths of cord, each length having one end embedded in the edge of the strip opposite the first edge and in staggered relationship to the cords in the first edge. Pullout adhesion is measured on a tensile tester by arranging the adhesion block so that the cords are vertical and the rubber strip horizontal, and by holding two lower wires and pulling out the upper wire between them at a crosshead speed of 5 cm/min. The pullout force recorded is the mean of the values for each of the several lower cords except those at each end of the strip, which are not taken into account in order to eliminate possible end effects. Where the pullout force exceeds the breaking load of one or more of the wires in the test procedure, this is signified in the Tables by the symbol >. Rubber coverage on the pulled out cord is assessed on the scale 0 (bare cord) to 10 (100% coverage) by comparison with standard samples. High coverage values indicate failure in the rubber phase rather than at the rubber-metal interface, and may mean that the rubber has poor physical properties unless accompanied by high pullout force.

The results given in the tables below under the headings "Initial Adhesion", "Air Ageing", "Steam Ageing" and "Salt Bath Ageing" were obtained on adhesion blocks where the rubber was cured at 145° C. for $T_{90}+5$ minutes, "$T_{90}$" being the time in minutes taken for a sample of the same rubber cured in a rheometer (British Standard Test Method 1673 Part 10) to reach 90% of the maximum modulus. Blocks that were "air aged" before testing were subjected at 85° C. to the conditions of British Standard Method 903, Part A.19 (1975) after curing. Those that were "steam aged" were kept in steam under pressure at 120° C. for 8 hours and those that were "salt bath aged" were immersed in a 5% sodium chloride solution at 90° C. after curing and before testing. Results shown under the heading "2 $T_{90}$" were obtained on blocks that were cured twice the $T_{90}$ time, i.e. were "overcured".

In "Steel Cord: Analysis of Used Truck Tires and Simulation of the Found Phenomena in Laboratory Experiments" an article in "Tire Reinforcement and Tire Performance", ASTM STP 694, R. A. Fleming and D. I. Livingston, Eds, American Society for Testing and Materials, 1979, pp. 69-86, C. C. J. de Jong concludes that in evaluating tyres and other composites containing metal cord reinforcement, attention should be paid to aged adhesion rather than to initial adhesion. The ageing conditions mentioned above are similar to those proposed by de Jong to simulate, at an enhanced level, various conditions which might be encountered during the service life of a tyre. In Table 1, the adhesion promoters are di- or tri-sodium salts as follows:

| Formula (Excluding possible water of crystallisation | Promoter number in Table 1 |
|---|---|
| $NaO_3S_2-(CH_2)_4-O-CH_2-O-(CH_2)_4S_2O_3Na$ | 5 |
| $NaO_3S_2-(CH_2)_2-O-CH_2-O-(CH_2)_2S_2O_3Na$ | 6 |
|  $NaO_3S_2-(CH_2)_3-\overset{O}{\overset{\|}{C}}-O-(CH_2)_4S_2O_3Na$ | 7 |
| $[NaO_3S_2(CH_2)_{10}COO(CH_2)_2]_2O$ | 8 |
| 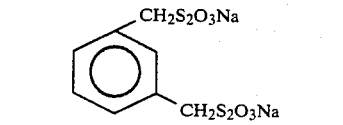 | 9 |
| 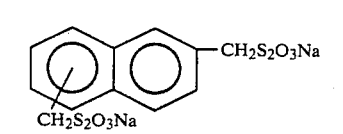 | 10 |
| | 11 |
| $NaO_3S_2(CH_2)_2SO_2(CH_2)_2S_2O_3Na$ | 12 |
| $O=C(CH_2S_2O_3Na)_2$ | 13 |
| 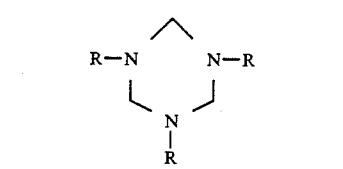 (R is $-COCH_2CH_2S_2O_3Na$) | 14 |

TABLE 1

| Promoter Number | Pull-out Force is quoted in Newtons/cm, with rubber coverage in parentheses | | | | | | | | |
|---|---|---|---|---|---|---|---|---|---|
| | Initial Adhesion | 2 $T_{90}$ | Air Ageing (Days) | | Steam Ageing | Salt Bath Ageing (Hours) | | | |
| | | | 5 | 10 | | 8 | 16 | 24 | 48 |
| Blank Control | 440(5) | 450(6) | 360(7) | 300(7) | 480(7) | 390(5) | 310(4) | 250(4) | 160(1) |
| Cobalt Naphthenate | >560 | >550 | 500(7) | 460(6) | 220(0) | 530(6) | 350(1) | 260(2) | 130(0) |
| Blank Control* | 490(4) | 520(4) | 430(7) | 350(7) | 530(8) | 260(1) | 190(1) | 160(2) | 100(1) |
| Cobalt Naphtenate* | >560 | >560 | 500(7) | 400(6) | 170(0) | 480(5) | 180(1) | 150(2) | 90(0) |
| 1 | 570(7) | >530 | 470(8) | 400(7) | 510(7) | 410(4) | 310(1) | 250(1) | 180(1) |
| 2 | 570(7) | >560 | 480(9) | 390(8) | 510(9) | 370(3) | 310(4) | 230(3) | 200(1) |
| 3 | 490(7) | 520(8) | 410(7) | 350(6) | 480(8) | 380(6) | 400(6) | 360(5) | 270(3) |
| 4 | 530(7) | 500 | 410(4) | 400(8) | >580 | 370(4) | 260(4) | 230(4) | 210(4) |
| 5 | 550(7) | 570(8) | 480(4) | 400(8) | >570 | 360(3) | 290(2) | 180(4) | 220(4) |
| 6 | 540(7) | 520(7) | 450(6) | 380(8) | >550 | 430(4) | 390(4) | 230(4) | 180(4) |
| 7 | 570(7) | 510(8) | 380(6) | 340(8) | >550 | 500(5) | 440(4) | 460(3) | 360(4) |
| 8 | >550 | 530(8) | 430(8) | 420(5)* | 460(6)* | 440(3)* | 310(3)* | 180(2)* | 200(2)* |
| 9 | 520(7) | 560(8) | 380(5) | 340(7) | 530(8) | 370(4) | 290(4) | 250(2) | 130(1) |
| 10 | 520(5) | 560(8) | 410(6) | 330(6) | 580(8) | 430(4) | 240(4) | 250(1) | 220(3) |
| 11 | 530(8) | >560 | 470(4) | 430(7)* | 470(7) | 320(2) | 270(2) | 250(2) | 110(1) |
| 12 | >560* | 530(5) | 430(8) | 430(8) | 430(8) | 440(4) | 380(4) | 300(4) | 250(4) |
| 13 | 480(4) | 490(5) | 420(6) | 430(7) | 560(8)* | 410(4)* | 300(5)* | 230(2)* | 130(1)* |
| 14 | 450(7) | 500(4) | 410(5) | 360(7) | 550(8) | 350(2) | 320(3) | 260(4) | 190(2) |
| $2^{xx}$ | 470(8) | 470(8) | 400(4) | 370(7) | 350(6) | 530(8) | 430(7) | — | 280(4) |

| Formula (Excluding possible water of crystallisation | Promoter number in Table 1 |
|---|---|
| $NaO_3S_2(CH_2)_5S_2O_3Na$ | 1 |
| $NaO_3S_2(CH_2)_6S_2O_3Na$ | 2 |
| $NaO_3S_2(CH_2)_{10}S_2O_3Na$ | 3 |
| $NaO_3S_2-(CH_2)_4-O-(CH_2)_4S_2O_3Na$ | 4 |

In Table 2, the adhesion promoters are mixtures of nickel salts and the corresponding sodium salts of bis thiosulphates as follows:

| Formula of Nickel Salt (Excluding possible water of crystallisation) | Promoter number in Table 2 |
|---|---|
| $[^-O_3S_2(CH_2)_5S_2O_3^-]Ni^{++}$ | 1 |
| $[^-O_3S_2(CH_2)_6S_2O_3^-]Ni^{++}$ | 2 |
| $[^-O_3S_2(CH_2)_{10}S_2O_3^-]Ni^{++}$ | 3 |
| $[^-O_3S_2-(CH_2)_4-O-(CH_2)_4S_2O_3^-]Ni^{++}$ | 4 |
| $[^-O_3S_2-(CH_2)_3COO(CH_2)_4S_2O_3^-]Ni^{++}$ | 5 |
| $[[O_3S_2-(CH_2)_{10}-COO(CH_2)_2]_2O]^{--}Ni^{++}$ | 6 |
| $[^-O_3S_2(CH_2)_2O-CH_2-O(CH_2)_2S_2O_3^-]Ni^{++}$ | 7 |
| $[^-O_3S_2(CH_2)_2SO_2(CH_2)_2S_2O_3^-]Ni^{++}$ | 8 |

| Formula or Name (Excluding possible water of crystallisation) | Promoter Number in Table 3 |
|---|---|
| $[^-O_3S_2(CH_2)_6S_2O_3^-]A_2$ where A is N—benzyl-N—1,1,3,3-tetramethylbutylammonium | 4 |
| Nickel laurate | 5 |
| Mixture of 2 parts by weight nickel laurate and 2 parts by weight $NaO_3S_2(CH_2)_6S_2O_3Na$ | 6 |

TABLE 3

| | Pull-out force is quoted in Newtons/cm, with rubber coverage in parentheses | | | | | | | |
|---|---|---|---|---|---|---|---|---|
| | Initial | | Air Ageing (Days) | | Steam | Salt Bath Ageing (Hours) | | |
| Promoter Number | Adhesion | 2 T$_{90}$ | 5 | 10 | Ageing | 8 | 16 | 48 |
| Blank Control | 440(5) | 450(6) | 360(7) | 300(7) | 480(7) | 390(5) | 310(4) | 160(1) |
| 1 | 550(8) | 520(8) | 480(9) | 430(8) | 470(7) | 530(6) | 420 | 200(2) |
| 2 | 550(8) | 520(8) | 440(8) | 420(8) | 430(6) | 530(8) | 480(6) | 240(1) |
| 3 | 540(9) | 520(9) | 470(8) | 400(6) | 450(5) | 530 | 490(8) | 450(5) |
| 4 | 480(6) | 470(8) | 460(8) | 360(8) | 310(3) | 550(7) | 510(7) | 340(5) |
| 5 | 510(6) | 490(6) | 380(6) | 270(6) | 210(1) | 360(4) | 390(4) | 270(1) |
| 6 | >550 | >550 | 450(8) | 380(8) | >560 | 450(5) | 370(4) | 370(3) |

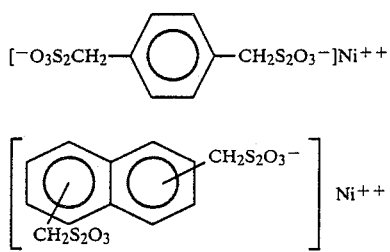

9

$$\left[\begin{array}{c}\phantom{x}\\ CH_2S_2O_3^-\\ CH_2S_2O_3^-\end{array}\right]Ni^{++}$$

10

The mixtures were prepared by passing a solution of the sodium salt through a column of cation exchange loaded with nickel and evaporating the eluate. Elemental analyses of the products showed that about 50% of the original sodium had been displaced by nickel with the exception of Promoter No. 2 where only about 30% of the sodium had been displaced.

TABLE 2

| | Pull-out Force is quoted in Newtons/cm, with rubber coverage in parentheses | | | | | | | |
|---|---|---|---|---|---|---|---|---|
| | Initial | | Air Ageing (Days) | | Steam | Salt Bath Ageing (Hours) | | |
| Promoter Number | Adhesion | 2 T$_{90}$ | 5 | 10 | Ageing | 8 | 16 | 48 |
| Blank Control | 440(5) | 450(6) | 360(7) | 300(7) | 480(7) | 390(5) | 310(4) | 160(1) |
| 1 | 560(9) | 540 | 500(8) | 430(8) | 550(8) | 540(8) | 460(5) | 310(4) |
| 2 | 580 | 530 | 490(8) | 390(8) | 550(8) | 540 | 450(5) | 450(7) |
| 3 | 500(7) | 540(9) | 430(8) | 380(8) | 510(7) | 430(5) | 430(4) | 420(4) |
| 4 | 530(8) | 470 | 470(8) | 390(8) | 540(8) | 540(8) | 440(8) | 310(4) |
| 5 | 520 | 530(8) | 490(8) | 410(8) | 540(8) | 520 | 540(5) | 450(7) |
| 6 | 500 | 520(7) | 470(8) | 410(8) | 540(8) | 490(5) | 330(4) | 300(2) |
| 7 | 560(9) | 540(9) | 470(8) | 400(8) | 520(8) | 520(8) | 520(7) | 290(5) |
| 8 | 540 | 540(8) | 500(8) | 390(8) | 540(8) | 560 | 520 | 520(7) |
| 9 | 530(8) | 510(8) | 460(8) | 410(8) | 440(7) | 530(8) | 490(6) | 350(3) |
| 10 | 540(9) | 520(9) | 470(8) | 400(8) | 560(8) | 520(8) | 440(4) | 430(4) |

Table 3 shows results obtained with various adhesion promoters as follows:

| Formula or Name (Excluding possible water of crystallisation) | Promoter Number in Table 3 |
|---|---|
| $[C_2H_5OOCCH_2CH_2S_2O_3^-]_2Ni^{++}$ | 1 |
| Mixture of $[CH_3(CH_2)_3S_2O_3^-]_2Ni^{++}$ and $[CH_3(CH_2)_3S_2O_3^-]_2Na_2^+$ | 2 |
| $[^-O_3S_2(CH_2)_6S_2O_3^-]Co^{++}$ | 3 |

The results listed in Table 1 show that while the known adhesion promoter cobalt naphthenate gives higher initial adhesion values than the control it actually has an adverse effect on vulcanised composites that are subject to steam ageing and salt bath ageing. In contrast, the adhesion promoters of the present invention improve initial adhesion relative to the control and show good retention of adhesion on ageing.

The results listed in Table 2 show the adhesion promotion effects of nickel organic thiosulphates. Improvement in initial adhesion and salt bath ageing is particularly significant.

There is evidence from the above results that in the bonding of rubber to brass, adhesion promoters where M represents a mixture of sodium and nickel ions are more effective than analogous compounds where M represents sodium alone. Comparison of the results obtained with nickel laurate (Promoter No. 5 in Table 3) with those obtained with the nickel organic thiosulphates of the present invention show, however, that the latter have advantages over the prior art nickel compound (USA 3991130), in respect to air ageing and steam ageing.

The results obtained with Promoter No. 6 in Table 3 again show that an improvement over the use alone of a promoter of this invention where M is sodium (Promoter No. 2 in Table 1) can be achieved by using a mixture of such a promoter with a prior art nickel compound. The result also shows that such a mixture is better than the prior art nickel compound alone. A similar result would be expected where M in the promoter of this invention is, for example, an alkali metal other than sodium, an alkaline earth metal or zinc.

Comparison of the results obtained with Promoter No. 3 in Table 3 with those obtined with cobalt naphthenate (Table 1), shows that the adverse effect on ageing is avoided when the cobalt is present in association with an organic thiosulphate anion.

The results shown in Table 4 were obtained using the vulcanisable rubber composition described above, with N,N-di-cyclohexylbenzothiazole-2-sulphenamide as the accelerator, and using the cord with a coating of brass having a copper content of 63.5+3% by weight.

The adhesion promoters of Table 4 are set out below:

| Formula or Name (Excluding Possible Water of Crystallisation | Promoter Number In Table 4 |
| --- | --- |
| $CH_3OOCCHS_2O_3Na$ | 1(a) |
| Hexamethylene-1,6-bis(thiosulphate) | 2 |
| 2,2,4-trimethyl-1,2-dihydroquinolinium salt | |
| Hexamethylene-1,6-bis(thiosulphate) N—isopropyl-N'—(p-phenylaminophenyl)-ammonium salt | 3 |
| 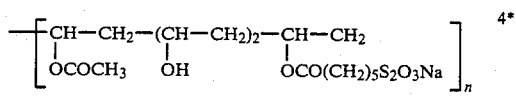 | 4* |
| $[^-O_3S_2CH_2CH=CHCH_2S_2O_3^-]_2Na^+$ | 5 |
| Hexamethylene-1,6-bis(thiosulphate)Ba salt | 6 |
| Hexamethylene-1,6-bis(thiosulphate)Mg salt | 7 |
| Hexamethylene-1,6-bis(thiosulphate)Zn salt | 8 |
| Mixture of 3 parts by weight hexamethylene-1,6-bis(thiosulphate) disodium salt and 1 part by weight nickel chloride | 9 |
| Nickel chloride | 9A(b) |
| $[CH_3OOCCHS_2O_3^-]_2Ni^{++}$ | 10(c) |
| ![OH-phenyl-S2O3 Ni++]2 structure | 11(d) |
| $[C_6H_5CH_2S_2O_3^-]_2Ni^{++}$ | 12(e) |
| $[C_6H_5CH_2S_2O_3^-]_2Co^{++}$ | 13(f) |
| $[n-C_7H_{15}S_2O_3^-]_2Ni^{++}$ | 14(g) |

(a) At 1.6 phr
(b) At 1.0 phr
(c) At 1.41 phr
(d) At 1.31 phr
(e) At 1.33 phr
(f) At 1.36 phr
(g) At 1.36 phr
*Average formula

TABLE 4

Pull-out force is quoted in Newtons/cm, with rubber coverage in parentheses

| Promoter Number | Initial Adhesion | 2 T90 | Air Ageing (days) 5 | 10 | Steam Ageing | Salt Bath Ageing (Hours) 8 | 16 | 48 |
| --- | --- | --- | --- | --- | --- | --- | --- | --- |
| 1 | >475 | | | 446(7) | >507 | | | 376(4) |
| 2 | 490(8) | 530(8) | 390(6) | 350(5) | 500(8) | 530(8) | 470(5) | 330(3) |
| 3 | 430(5) | 500(6) | 280(4) | 220(3) | 500(9) | 500(6) | 430(4) | 360(4) |
| 4 | 540 | 550(9) | 430(7) | 330(7) | 430(9) | 530(8) | 430(7) | 350(3) |
| 5 | >490 | | | 380(5) | >510 | | | 240(4) |
| 6 | >490 | | | 320(6) | 370(2) | | | >440 |
| 7 | >490 | | | 350(4) | 350(1) | | | >510 |
| 8 | >460 | | | 370(6) | 350(2) | | | >510 |
| 9 | >470 | | | 440 | 440 | | | 440 |
| 9A | >480 | | | 430 | 420 | | | 210 |
| 10 | 480 | | | 370 | 450 | | | 320 |
| 11 | 480 | | | 410 | 510 | | | 320 |
| 12 | 510 | | | 430 | 500 | | | 440 |
| 13 | 540 | | | 370 | 470 | | | 410 |
| 14 | 470 | | | 370 | 490 | | | 400 |
| Blank Control for Nos. 1 & 5-14 | 380(4) | | | | 450 | | | 260(2) |
| Blank Control for Nos. 2, 3 & 4 | 290(2) | 340(3) | 260(3) | 260(3) | 540(8) | 390(4) | 320(3) | 290(3) |

The results in Table 4 show that all the compounds tested have significant metal-rubber promoter activity relative to the controls. Nickel chloride (9A), which is disclosed in FR-A-2053749 as a promoter for rubber-metal bonding, is included for comparison with the mixture of nickel chloride and hexamethylene-1,6-bis(thiosulphate)disodium salt (9). The presence of the latter results in a marked improvement in the resistance of the composite to salt bath ageing.

The results shown in Table 5 were obtained using a vulcanisable rubber composition having components the same as that described above except that the rubber was a mixture of 80 parts by weight of natural rubber and 20 parts by weight of polybutadiene 1220 rubber and the accelerator was N,N-dicyclohexylbenzothiazole-2-sulphenamide at 1.0 part phr. In Experiments 1, 2, and 3, the cord was made from steel wire coated with brass having a copper content of 63.5%, and in Experiments 4, 5 and 6 the cord was made from steel wire coated with a ternary alloy of copper 70%, cobalt 4% and zinc 26%.

TABLE 5

| Experiment | Promoter | Initial Adhesion | 2 T90 | Air Ageing (days) 5 | 10 | Steam Ageing | Salt Bath Ageing (Hours) 8 | 16 | 48 |
|---|---|---|---|---|---|---|---|---|---|
| 1 | None | 360(3) | 360(3) | 350(4) | 330(4) | 520(9) | 430(7) | 450(6) | 280(4) |
| 2 | 2, Table 1 | 460(7) | 480(8) | 300(5) | 330(6) | 500(9) | 490(8) | 530(8) | 500(7) |
| 3 | 2, Table 2 | >520 | >570 | 500(8) | 420(8) | 540(9) | 500(8) | 530(8) | 370(4) |
| 4 | None | 260(2) | | | | 420(5) | | | 260(3) |
| 5 | 2, Table 1 | 400(7) | | | | 410(4) | | | 390(5) |
| 6 | 2, Table 2 | 480(7) | | | | 430(6) | | | 290(5) |

The results in Table 6 were obtained with a rubber compositions as follows:

| | |
|---|---|
| Natural Rubber | 30 |
| Polybutadiene Rubber 1220 | 25 |
| Oil-Extended Styrene-Butadiene Rubber 1712 (37.5% oil) | 67.5 |
| Carbon Black | 60 |
| Zinc Oxide | 5 |
| Stearic Acid | 1.5 |
| Process Oil | 10 |
| Antidegradant[1] | 2 |
| Antioxidant[2] | 1 |
| Sulphur | 4 |
| Accelerator[3] | 1 |
| Bonding Promoter | 3 |

[1] N—1,3-dimethylbutyl-N'—phenyl-p-phenylenediamine
[2] Polymerised 2,2,4-trimethyl-1,2-dihydroquinoline
[3] N,N—dicyclohexylbenzothiazole-2-sulphenamide

TABLE 6

| Promoter | Initial Adhesion | 2 T90 | Air Ageing (days) 5 | 10 | Steam Ageing | Salt Bath Ageing (Hours) 8 | 16 | 48 |
|---|---|---|---|---|---|---|---|---|
| None | 150(1) | 170(1) | 120(1) | 120(1) | 160(1) | 260(3) | 340(3) | 190(1) |
| 2, Table 1 | 360(8) | 370(9) | 270(8) | 220(6) | 410(9) | 380(8) | 280(5) | 300(3) |

Table 7 gives the results of experiments designed to investigate the effect of variations in the amount of sulphur in the vulcanisable compositions. The adhesion promoter was 1,6-hexamethylene bis(thiosulphate) nickel salt, hexahydrate at 1.0 part by weight per 100 parts of rubber. Otherwise, except for the results marked with an asterisk, and except where the accelerator was N-tert-butylbenzothiazole-2-sulphenamide, the composition was the same as that used in obtaining the results of Table 1. The brass coating on the cord contained 63.5±3% by weight of copper. The results marked with an asterisk were obtained with a composition containing 0.5 parts of stearic acid per 100 parts by weight of rubber. The results show optimum properties at 3–4 parts by weight of sulphur per 100 parts by weight of rubber.

TABLE 7

| Amount of Sulphur (phr) | Accelerator** | Initial Adhesion | Air Ageing (10 Days) | Steam Ageing | Salt Bath Ageing (48 Hours) |
|---|---|---|---|---|---|
| 2 | MBS | 510 | 480 | 480 | 480 |
| 2 | DCBS | 500 | 370 | 350 | 270 |
| 3 | MBS | >540 | 460 | >590 | 460 |
| 4 | MBS | 550 | 490 | 480 | 350 |
| 4 | DCBS | 530 | 410 | 410 | 360 |
| 4 | MBS | 570* | 420* | 510* | 320* |
| 4 | DCBS | 510* | 390* | 540* | 220* |
| 5 | MBS | >540 | 360 | >560 | 370 |
| 7 | MBS | >530 | 350 | >520 | 280 |
| 8 | TBS | 510 | 410 | 440 | 280 |

**MBS = 2(Morpholinothio)benzothiazole
DCBS = N,N—dicylcohexylbenzothiazole-2-sulphenamide
TBS = N—tert-butylbenzothiazole-2-sulphenamide Table 8 gives the results of experiments designed to investigate the effect of variations in the amount of the rubber-metal bonding agent, in this instance 1,6-hexamethylene-bis(thiosulphate) nickel salt, hexahydrate (HTSNi). The rubber composition was otherwise the same as that used in obtaining the results of Table 1, with 2(morpholinothio)benzothiazole as the accelerator.

Values in parentheses were obtained with cord having a brass coating containing 67.5±3% by weight of copper. The other values were obtained with cord having a brass coating containing 63.5±3% by weight of copper.

High rubber-metal bonding promoter activity is shown with as little as 0.75 part of HTSNi per 100 parts by weight of rubber, and the optimum is at 1.0 part by weight of HTSNi.

TABLE 8

| Amount of HTSNI (phr) | Initial Adhesion | 2 T90 | Air Ageing (10 Days) | Steam Ageing | Salt Bath Ageing (48 Hours) |
|---|---|---|---|---|---|
| 0.5 | 600(>570) | >520 | 390(320) | 490 | 240(280) |
| 0.75 | >530(>540) | >510 | 390(400) | >550 | 310(270) |
| 1.0 | >520(>560) | >530 | 430(400) | >530 | 470(270) |
| 2.0 | >520(>560) | >540 | 430(440) | 540 | 460(320) |
| None (Control) | 420(480) | 450 | 290(370) | >550 | 90(140) |

In other experiments reported in Table 9, 1,6-hexamethylene bis(thiosulphate) nickel salt, hexahydrate (HTSNi) was compared with other nickel compounds as a brass-rubber adhesion promoter. The adhesion promoter was used at a level of 1.0 part by weight per 100 parts by weight of rubber. Otherwise the rubber composition was the same as that used in obtaining the results given in Table 1, with N,N-dicyclohexylbenzothiazole- 2-sulphenamide as accelerator. The cord has a brass coating containing 63.5%±3% by weight of copper.

HTSNi showed better overall performance than other nickel compounds particularly during salt bath ageing.

TABLE 9

| Promoter | Pull-out force in Newtons/cm | | |
|---|---|---|---|
| | Initial Adhesion | Steam Ageing | Salt Bath Ageing (48 Hours) |
| HTSNi | 580 | 530 | 470 |
| Nickel laurate | 430 | 270 | 170 |
| Nickel acetyl-acetonate | 350 | 380 | 360 |
| Nickel phosphonate complex* | 370 | 530 | 200 |

*Nickel bis(0-ethyl-3,5-di-t-butyl-4-hydroxybenzylphosphonate)
See Example 3, US-A-3 991 130.

Details of the preparation of nickel benzylthiosulphate are given below:

Sodium benzylthiosulphate (57.5 g) and anhydrous $NiCl_2$ (14.2 g) were mixed in absolute methanol (150 ml) at room temperature, and the mixture was stirred for 24 hours. It was then filtered, and methanol was evaporated from the filtrate. The residue was treated with water (50 ml) to displace the residual methanol, and the resulting solution was evaporated to dryness under vacuum, at a temperature not exceeding 50° C.

The residue analysed as follows:

| | |
|---|---|
| $Ni^{++}$ (by titration) | 10.23% |
| Benzylthiosulphate (Nmr spectrum) | 68.8% |
| Water (Nmr spectrum) | 21.2% |

This analysis corresponds approximately to the formula $$[C_6H_5CH_2S_2O_3{}^-]Ni^{++}.7H_2O.$$

The yield was 62%.

Table 10 gives results obtained in the evaluation of various rubber/metal bonding promoters as set out below. The adhesion promoter was used at a level of 1.0 part by weight per 100 parts by weight of rubber. Otherwise the rubber composition was the same as that used in obtaining the results given in Table 1, with 2(morpholino)benzothiazole as accelerator. The cord had a brass coating containing 63.5±3% by weight of copper.

| Promoter Number in Table 10 | Formula (excluding possible water of crystallisation) |
|---|---|
| 1 | $C_{12}H_{25}S_2O_3Na$ |
| 2 | $(C_{12}H_{25}S_2O_3)_2Ni$ |
| 3 | $C_{16}H_{33}S_2O_3Na$ |
| 4 | $CH_2{=}CHCH_2S_2O_3Na$ |
| 5 | 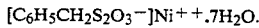 $CH_3CHCH_2CH_2S_2O_3Na$ with $CH_3$ branch |
| 6 | $(C_6H_5CH_2CH_2S_2O_3)_2Ni$ |
| 7 | $Cl(CH_2)_3S_2O_3Na$ |
| 8 | $[O_3S_2(CH_2)_6S_2O_3]^-Mn$ |

TABLE 10

| Promoter | Pull-out Force in Newtons/cm | | |
|---|---|---|---|
| | Initial Adhesion | Steam Ageing | Salt Bath Ageing (48 Hours) |
| 1 | 490 | 470 | 310 |
| 2 | 490 | 500 | 390 |
| 3 | 570 | 520 | 230 |
| 4 | 520 | 600 | 360 |
| 5 | 590 | 480 | 240 |
| 6 | 500 | 420 | 420 |
| 7 | >500 | >530 | 300 |
| 8 | 520 | 560 | 320 |

Details of the preparation of various novel monothiosulphates are given below:

Nickel benzylthiosulphate

Sodium benzylthiosulphate (57.5 g) and anhydrous $NiCl_2$ (14.2 g) were mixed in absolute methanol (150 ml) at room temperature, and the mixture was stirred for 24 hours. It was then filtered, and methanol was evaporated from the filtrate. The residue was treated with water (50 ml) to displace the residual methanol, and the resulting solution was evaporated to dryness under vacuum, at a temperature not exceeding 50° C.

The residue analysed as follows:

| | |
|---|---|
| $Ni^{++}$ (by titration) | 10.23% |
| Benzylthiosulphate (Nmr spectrum) | 68.8% |
| Water (Nmr spectrum) | 21.2% |

This analysis corresponds approximately to the formula

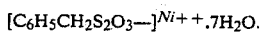
$$[C_6H_5CH_2S_2O_3{-}]^{Ni++}.7H_2O.$$

The yield was 62%.

By a similar procedure there were prepared
Cobalt benzylthiosulphate
Nickel n-heptylthiosulphate
Nickel 2,5-dihydroxyphenylthiosulphate (from the potassium salt described in D.R.P. 175070)
Nickel dodecylthiosulphate
Nickel 1-(methoxycarbonyl)ethyl-1-thiosulphate
Nickel n-butylthiosulphate, nickel 2-(ethoxycarbonyl)ethyl-1-thiosulphate and nickel 2-phenylethyl thiosulphate were prepared by the ion-exchange method described in EP-A-0070143 from the sodium salts.

Sodium allylthiosulphate

A mixture of allyl bromide (100 g), sodium thiosulphate (212.5 g), ethanol (90 ml) and water (40 ml) was stirred and heated to reflux for 15 minutes, giving a homogeneous solution. The solution was allowed to cool somewhat, and ethanol and water were then evaporated under vacuum. The solid residue was added to absolute ethanol, and the solvent was then evaporated under vacuum to remove more water. The residue was stirred with hot ethanol (800 ml), and the suspension thus obtained was filtered. On cooling, the filtrate deposited a white solid (109.2 g). The NMR spectrum of the solid showed that it consisted of 80% by weight of sodium allylthiosulphate, 11% by weight of water and 9% by weight of inorganic salt.

Sodium 3-chloropropylthiosulphate

This was obtained by the reaction of 1-iodo-3-chloropropane with sodium thiosulphate pentahydrate in aqueous ethanol solution under conditions resulting in the preferential replacement of the iodine atom of the starting material, although the product contained some propane bis thiosulphate, sodium salt.

IR spectrum 1610—1430—1200—1030—640 cm$^{-1}$

Sodium 2-(ethoxycarbonyl)ethylthiosulphate

This was obtained by the reaction of ethyl 3-chloropropionate and sodium thiosulphate in aqueous ethanol, and isolation of the product by evaporation of the solvents under reduced pressure, extraction of the residue with hot ethanol, and evaporation of the ethanol extract after filtration. The IR spectrum was consistent with the expected structure, and titration with HgCl$_2$ showed the presence of 97.1% of the theoretical of S$_2$O$_3$Na group content.

Sodium 1-(methoxycarbonyl)ethylthiosulphate

This was obtained by the reaction of methyl 2-chloropropionate with sodium thiosulphate in aqueous ethanol, and isolation of the product by a procedure similar to that described for sodium 2-(ethocycarbonyl)ethylthiosulphate above. NMR analysis showed the presence of 77.3% thiosulphate, 2.2% water, 0.7% methanol and the balance a mixture of inorganics and organic impurities.

The embodiments of the invention in which an exclusive property or privilege is claimed are defined as follows:

1. A compound of the formula $(R^1-S-SO_3)_2M^1$ or a hydrate thereof where $R^1$ represents an organic radical which is a C$_{3-20}$ alkyl group, a C$_{2-20}$ chloroalkyl group, a C$_{3-20}$ alkenyl group, a phenyl (C$_{1-16}$ alkyl) group, a 2,5-dihydroxyphenyl group or a grouping of the formula $R^7OOCR^8$- where $R^7$ is a C$_{1-12}$ alkyl group and $R^8$ is a C$_{1-12}$ alkylene group, and $M^1$ represents cobalt or nickel.

2. A compound according to claim 1 where $R^1$ represents a C$_{4-18}$ alkyl group, a C$_{3-12}$ chloroalkyl group, a C$_{3-12}$ alkenyl group, a phenyl (C$_{1-6}$ alkyl) group or a grouping of the formula $R^7OOCR^8$- where $R^7$ is a C$_{1-8}$ alkyl group and $R^8$ is a C$_{1-8}$ alkylene group and $M^1$ is nickel.

3. A compound according to claim 2 where $R^1$ represents a C$_{4-12}$ alkyl group, a benzyl or 2-phenylethyl group or a grouping of the formula $R^7OOCR^8$- where $R^7$ represents methyl or ethyl and $R^8$ represents ethylene or ethylidene.

4. A compound having the formula $R^7OOCR^8$-S$_2$O$_3$Na or a hydrate thereof, where $R^7$ is a C$_{1-8}$ alkyl group and $R^8$ is a C$_{1-8}$ alkylene group.

5. A compound according to claim 4 where $R^7$ represents methyl or ethyl and $R^8$ represents ethylene or ethylidene.

* * * * *